(12) United States Patent
Larsson et al.

(10) Patent No.: US 8,289,952 B2
(45) Date of Patent: Oct. 16, 2012

(54) ENHANCED VOIP MEDIA FLOW QUALITY BY ADAPTING SPEECH ENCODING BASED ON SELECTED MODULATION AND CODING SCHEME (MCS)

(75) Inventors: Anders Larsson, Stockholm (SE); Martin Lars Bäckström, Danderyd (SE); David Bladsjö, Stockholm (SE); Patrik Cerwall, Tyresö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1960 days.

(21) Appl. No.: 11/346,565

(22) Filed: Feb. 3, 2006

(65) Prior Publication Data
US 2006/0268837 A1    Nov. 30, 2006

Related U.S. Application Data

(60) Provisional application No. 60/684,232, filed on May 25, 2005.

(51) Int. Cl.
*H04L 12/66* (2006.01)
(52) U.S. Cl. ........ 370/352; 370/356; 370/528; 370/328; 375/264; 375/267; 375/260
(58) Field of Classification Search .......... 370/352–356, 370/328, 528; 375/264, 267, 260
See application file for complete search history.

(56) References Cited

U.S. PATENT DOCUMENTS

| | | | |
|---|---|---|---|
| 5,701,294 A | 12/1997 | Ward et al. | |
| 5,774,808 A | 6/1998 | Sarkioja et al. | |
| 5,987,032 A | 11/1999 | Nadgauda et al. | |
| 6,282,192 B1 | 8/2001 | Murphy et al. | |
| 6,374,112 B1 | 4/2002 | Widegren et al. | |
| 6,466,794 B1 | 10/2002 | Posti et al. | |
| 6,493,541 B1 | 12/2002 | Gunnarsson et al. | |
| 6,590,928 B1 | 7/2003 | Haartsen | |
| 6,757,542 B2 | 6/2004 | Bruin et al. | |

(Continued)

FOREIGN PATENT DOCUMENTS

JP    2006/528437    12/2006

(Continued)

OTHER PUBLICATIONS

Related U.S. Appl. No. 11/298,939 filed Dec. 12, 2005, Inventors: Larsson et al.

(Continued)

*Primary Examiner* — Asad Nawaz
*Assistant Examiner* — Khaled Kassim
(74) *Attorney, Agent, or Firm* — Nixon & Vanderhye PC

(57) ABSTRACT

A voice-over-IP (VoIP) connection is established over a radio interface with a mobile radio station. A current radio condition for the VoIP connection is determined, and from that, a modulation and coding scheme (MCS) for a portion of the VoIP connection. A VoIP voice encoding mode for a portion of the VoIP connection is selected based on the determined modulation coding scheme. VoIP voice is then encoded into a number of VoIP encoded frames using the selected VoIP voice encoding mode which has an associated bit rate. An optimal number of VoIP encoded frames is included in a VoIP packet for transport over the VoIP connection given the selected voice encoding mode and the selected MCS. Other adjustments may be made to ensure robustness of the VoIP connection and/or to maximize capacity.

22 Claims, 9 Drawing Sheets

U.S. PATENT DOCUMENTS

| | | | |
|---|---|---|---|
| 6,778,831 B1 | 8/2004 | Sancho et al. | |
| 6,804,217 B1 | 10/2004 | Miyatani et al. | |
| 6,804,244 B1 | 10/2004 | Anandakumar et al. | |
| 6,845,123 B1 | 1/2005 | Nyberg et al. | |
| 6,868,080 B1 | 3/2005 | Umansky et al. | |
| 6,882,847 B2 | 4/2005 | Craig et al. | |
| 7,200,125 B2 | 4/2007 | Lohtia et al. | |
| 7,239,861 B2 | 7/2007 | Holur | |
| 7,336,957 B2 | 2/2008 | Marinier et al. | |
| 7,433,690 B2 | 10/2008 | Creamer et al. | |
| 7,580,424 B2 | 8/2009 | Ravishankar et al. | |
| 7,801,236 B2 * | 9/2010 | Tamaki et al. | 375/267 |
| 2001/0049790 A1 | 12/2001 | Faccin et al. | |
| 2002/0078214 A1 | 6/2002 | Shindou et al. | |
| 2002/0122406 A1 | 9/2002 | Chillariga et al. | |
| 2002/0145988 A1 | 10/2002 | Dahlman et al. | |
| 2002/0172163 A1 | 11/2002 | Chen et al. | |
| 2002/0181422 A1 | 12/2002 | Parantainen et al. | |
| 2003/0026245 A1 | 2/2003 | Ejzak | |
| 2003/0081576 A1 * | 5/2003 | Kim et al. | 370/335 |
| 2003/0081690 A1 * | 5/2003 | Kim et al. | 375/264 |
| 2003/0095542 A1 | 5/2003 | Chang et al. | |
| 2003/0128694 A1 | 7/2003 | Hundscheidt et al. | |
| 2003/0156557 A1 | 8/2003 | Kalden et al. | |
| 2003/0162512 A1 | 8/2003 | Lauterbach et al. | |
| 2004/0057378 A1 | 3/2004 | Gronberg | |
| 2004/0085949 A1 | 5/2004 | Partanen et al. | |
| 2004/0141572 A1 | 7/2004 | Johnson et al. | |
| 2004/0160979 A1 | 8/2004 | Pepin et al. | |
| 2004/0203727 A1 | 10/2004 | Abiri et al. | |
| 2004/0246990 A1 | 12/2004 | Krishnamurthi et al. | |
| 2005/0047396 A1 | 3/2005 | Helm et al. | |
| 2005/0163193 A1 * | 7/2005 | Maeda et al. | 375/130 |
| 2005/0195762 A1 | 9/2005 | Longoni et al. | |
| 2005/0226227 A1 * | 10/2005 | Kim et al. | 370/352 |
| 2006/0050680 A1 | 3/2006 | Naim et al. | |
| 2006/0088065 A1 * | 4/2006 | Khatter | 370/528 |
| 2006/0140113 A1 | 6/2006 | Anderlind et al. | |
| 2006/0142011 A1 | 6/2006 | Kallio | |
| 2006/0211437 A1 | 9/2006 | Yang | |
| 2006/0250957 A1 | 11/2006 | Gielty et al. | |
| 2006/0268792 A1 * | 11/2006 | Belcea | 370/338 |
| 2006/0268813 A1 | 11/2006 | Larsson et al. | |
| 2006/0268837 A1 | 11/2006 | Larsson et al. | |
| 2006/0268838 A1 | 11/2006 | Larsson et al. | |
| 2006/0268849 A1 | 11/2006 | Larsson et al. | |
| 2006/0268900 A1 | 11/2006 | Larsson et al. | |
| 2007/0083470 A1 | 4/2007 | Bonner et al. | |

FOREIGN PATENT DOCUMENTS

| | | |
|---|---|---|
| WO | 02/084929 | 10/2002 |
| WO | 03/019961 A1 | 3/2003 |
| WO | 2004/114684 | 12/2004 |

OTHER PUBLICATIONS

Related U.S. Appl. No. 11/298,938 filed Dec. 12, 2005, Inventors: Larsson et al.

Related U.S. Appl. No. 11/314,973 filed Dec. 22, 2005, Inventors: Larsson et al.

Related U.S. Appl. No. 11/288,436 filed Dec. 29, 2005, Inventors: Larsson et al.

Related U.S. Appl. No. 11/370,171 filed Mar. 8, 2006, Inventors: Larsson et al.

Office Action mailed Oct. 30, 2009 in co-pending U.S. Appl. No. 11/288,436.

Office Action mailed Jan. 30, 2009 in co-pending U.S. Appl. No. 11/288,436.

Office Action mailed Nov. 30, 2009 in co-pending U.S. Appl. No. 11/298,939.

Office Action mailed Jun. 8, 2009 in co-pending U.S. Appl. No. 11/298,939.

Office Action mailed May 29, 2009 in co-pending U.S. Appl. No. 11/298,938.

Office Action mailed Dec. 24, 2009 in co-pending U.S. Appl. No. 11/298,938.

Office Action mailed Aug. 21, 2008 in co-pending U.S. Appl. No. 11/370,171.

Office Action mailed Mar. 19, 2009 in co-pending U.S. Appl. No. 11/370,171.

Office Action mailed Nov. 3, 2009 in co-pending U.S. Appl. No. 11/370,171.

SIM Access; http://www.eurescom.; pp. 1-11.

3GPP TS 23.060 V5.2.0 (Jun. 2002); 3$^{rd}$ Generation Partnership Project; Technical Specification Group Services and System Aspects; General Packet Radio Service (GPRS); Service description; Stage 2 (Release 5); http://www.3gpp.org.

3GPP TS 23.060 V3.14.0 (Dec. 2002), 3$^{rd}$ Generation Partnership Project; Technical Specification Group Services and System Aspects; General Packet Radio Service (GPRS); Service description; State 2, pp. 1-193.

3GPP TR 23.806 V1.7.0 (Nov. 2005), Technical Specification Group Service and System Aspects; Voice Call Continuity between CS and IMS Study (Release 7).

Hamidian, K., et al. "Performance Analysis of a CDMA/FDMA Cellular Communication System with Cell Splitting," IEEE, 1997, pp. 545-550.

Kim, Won, S., et al., "Enhanced Capacity in CDMA Systems with Alternate Frequency Planning," IEEE, 1998, pp. 973-978.

Kang et al, "Adaptive QoS Control by Toggling Voice Traffic Between Circuit and Packet Cellular Networks", GLOBECOM 2003, IEEE Global Telecommunications Conference, Conference Proceedings, San Francisco, Dec. 1-5, 2003, New York, NY, IEEE publ. 2003-I2-01, vol. 7, pp. 3498-3503.

International Search Report and Written Opinion mailed Oct. 10, 2006 in corresponding PCT application No. PCT/SE2006/050124.

Office Action mailed Mar. 24, 2010 in co-pending U.S. Appl. No. 11/314,973.

International Search Report and Written Opinion mailed Nov. 9, 2006 in corresponding PCT application No. PCT/SE2006/050144.

Liebl et al, "Enhanced Packet-Based Transmission of Multi-Rate Signals Over Geran", Personal, Indoor and Mobile Radio Communications, 2004, PIMRC 2004, 15$^{th}$ IEEE Inter'l. Symposium, Sep. 5-8, 2004, vol. 3, pp. 1812-1816.

Chinese Office Action and English translation thereof mailed Sep. 20, 2010 in Chinese Application No. 200680017801.2.

3GPP TS 23.228 V7.1.0 (Sep. 2005), 3rd Generation Partnership Project; Technical Specification Group Services and System Aspects; IP Multimedia Subsystem (IMS); Stage 2 (Release 7).

3GPP TS 24.228 V5.13.0 (Jun. 2005), 3rd Generation Partnership Project; Technical Specification Group Core Network and Terminals; Signalling flows for the IP multimedia call control based on Session Initiation Protocol (SIP) and Session Description Protocol (SDP); Stage 3 (Release 5).

3GPP TS 24.229 V7.1.1 (Oct. 2005), 3rd Generation Partnership Project; Technical Specification Group Core Network and Terminals; IP Multimedia Call Control based on Session Initiation Protocol (SIP) and Session Description Protocol (SDP); Stage 3 (Release 7).

3GPP TR 22.941 V0.7.7 (Nov. 2001), 3rd Generation Partnership Project; Technical Specification Group Services and System Aspects; IP Based Multimedia Services Framework; Stage 0 (Release 5).

3GPP TS 32.225 V5.9.0 (Sep. 2005), 3rd Generation Partnership Project; Technical Specification Group Service and System Aspects; Telecommunication Management; Charging Management; Charging Data Description for IP Multimedia Subsystem (IMS) (Release 5).

3GPP TS 22.340 V6.2.0 (Mar. 2005), 3rd Generation Partnership Project; Technical Specification Group Service and System Aspects; IP Multimedia System (IMS) Messaging; Stage 1 (Release 6).

3GPP TS 29.228 V6.8.0. (Sep. 2005), 3rd Generation Partnership Project; Technical Specification Group Core Network and Terminals; IP Multimedia (IM) Subsystem Cx and Dx interfaces; Signalling flows and message contents (Release 6).

3GPP TS 22.250 V6.0.0 (Dec. 2002), 3rd Generation Partnership Project; Technical Specification Group Services and System Aspects; IP Multimedia Subsystem (IMS) group management; Stage 1 (Release 6).

3GPP TS 26.141 V6.1.0 (Mar. 2005), 3rd Generation Partnership Project; Technical Specification Group Services and System Aspects; IP Multimedia System (IMS) Messaging and Presence; Media formats and codecs (Release 6).

Ericsson White Paper; "IMS-IP Multimedia Subsystem—The Value of Using the IMS Architecture", Oct. 2004.

3GPP TS 23.060 V3.14.0 (Dec. 2002), $3^{rd}$ Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLS/MAC) protocol, pp. 1-313.

European Search Report issued in EP Appl 06 73 3513.3 on Sep. 16, 2011.

Office Action issued in Japanese Patent Appl 2008-513432 on Aug. 26, 2011.

* cited by examiner

ENHANCED VOIP MEDIA FLOW QUALITY BY ADAPTING SPEECH ENCODING BASED ON SELECTED MODULATION AND CODING SCHEME (MCS)

RELATED CASES

This application claims the benefit and priority of U.S. Provisional Patent Application 60/684,232, filed May 25, 2005, the entire contents of which is incorporated by reference in its entirety.

This application is related to the following US Patent Applications:

U.S. application Ser. No. 11/298,939, filed on Dec. 12, 2005 and entitled "Connection Type Handover Of Voice Over Internet Protocol Call Based On Resource Type," which is incorporated by reference in its entirety.

U.S. application Ser. No. 11/298,938, filed on Dec. 12, 2005 and entitled "Connection Type Handover Of Voice Over Internet Protocol Call Based Low-Quality Detection," which is also incorporated by reference in its entirety.

U.S. application Ser. No. 11/314,973, filed on Dec. 22, 2005 and entitled "Local Switching of Calls Setup by a Multimedia Core Network," which is also incorporated by reference in its entirety.

U.S. Pat. No. 7,801,105, filed on Nov. 29, 2005 and entitled "Scheduling Radio Resources For Symmetric Service Data Connections," which is also incorporated by reference in its entirety.

U.S. application Ser. No. 11/370,171, entitled "AUTHENTICATION OF AN APPLICATION LAYER MEDIA FLOW REQUEST FOR RADIO RESOURCES," which is also incorporated by reference in its entirety.

TECHNICAL FIELD

The present invention pertains to telecommunications and finds advantageous example application to Voice over Internet Protocol (VoIP) communications.

BACKGROUND

VoIP is the transport of voice traffic using the Internet Protocol (IP). In the mobile world, VoIP means using a packet-switched (PS) service for transport of Internet Protocol (IP) packets which contain, e.g., Adaptive Multi-Rate (AMR) codec speech frames for voice mobile phone calls. A packet-switched connection is often simply referred to as a data connection.

Circuit-switched networks use circuit switching for carrying voice traffic where the network resources are statically allocated from the sender to receiver before the start of the message transfer, thus creating a "circuit." The resources remain dedicated to the circuit during the entire message transfer and the entire message follows the same path. While this arrangement works quite well to transfer voice, IP is an attractive choice for voice transport for many reasons including lower equipment costs, integration of voice and data applications including multi-media like email, instant messaging, video, the world wide web, etc., lower bandwidth requirements, and the widespread availability of IP.

In packet-switched networks, the message is broken into packets, each of which can take a different route to the destination where the packets are recompiled into the original message. The packet switched (PS) service utilized for VoIP can be, for example, GPRS (General Packet Radio Service), EDGE (Enhanced Data Rates for Global Evolution), or WCDMA (Wideband Code Division Multiple Access). Each of these example services happen to be built upon the Global System for Mobile communications (GSM), a second generation ("2G") digital radio access technology originally developed for Europe. GSM was enhanced in 2.5G to include technologies such as GPRS. The third generation (3G) comprises mobile telephone technologies covered by the International Telecommunications Union (ITU) IMT-2000 family. The Third Generation Partnership Project (3GPP) is a group of international standards bodies, operators, and vendors working toward standardizing WCDMA-based members of the IMT-2000.

EDGE (sometimes referred to as Enhanced GPRS (EGPRS)) is a 3G technology that delivers broadband-like data speeds to mobile devices. EDGE allows consumers to connect to the Internet and send and receive data, including digital images, web pages and photographs, three times faster than possible with an ordinary GSM/GPRS network. EDGE enables GSM operators to offer higher-speed mobile-data access, serve more mobile-data customers, and free up GSM network capacity to accommodate additional voice traffic. EDGE uses the same TDMA (Time Division Multiple Access) frame structure, logical channels, and 200 kHz carrier bandwidth as GSM networks, which allows existing cell plans to remain intact.

In EDGE technology, a base transceiver station (BTS) communicates with a mobile station (e.g., a cell phone, mobile terminal or the like, including computers such as laptops with mobile termination). The base transceiver station (BTS) typically has plural transceivers (TRX). A time division multiple access (TDMA) radio communication system like GSM, GPRS, and EDGE divides the time space into time slots on a particular radio frequency. Time slots are grouped into frames, with users being assigned one or more time slots. In packet-switched TDMA, even though one user might be assigned one or more time slots, other users may use the same time slot(s). So a time slot scheduler is needed to ensure that the time slots are allocated properly and efficiently.

EDGE offers nine different Modulation and Coding Schemes (MSCs): MCS1 through MCS9. Lower coding schemes (e.g., MCS1-MCS2) deliver a more reliable but slower bit rate and are suitable for less optimal radio conditions. Higher coding schemes (e.g., MCS8-MCS9) deliver a much higher bit rate, but require better radio conditions. Link Quality Control (LQC) selects which MCS to use in each particular situation based on the current radio conditions.

In EDGE, the LQC selects a MCS for radio link control (RLC) data blocks for each temporary block flow (TBF). A TBF is a logical connection between a mobile station (MS) and a packet control unit (PCU). The PCU is usually (but not necessarily) located the radio access network, e.g., in the base station controller (BSC). A TBF is used for either uplink or downlink transfer of GPRS packet data. The actual packet transfer is made on physical data radio channels (PDCHs). The bit rate for a TBF is thus effectively selected by selecting a MCS, and changing the MCS for a TBF changes its bit rate.

Advanced Multi-rate (AMR) speech frames contain speech, typically 20 milliseconds of speech, encoded by an AMR codec. Voice encoder, vocoder, and codec are used interchangeably and refer to encoding speech/voice into a compressed digital format. An AMR codec supports unequal bit-error detection and protection (UED/UEP). The UEP/UED mechanisms allow more efficient transmission of speech over a lossy network by sorting the bits into perceptually more and less sensitive classes. A frame is only declared damaged and not delivered if there are one or more bit errors found in the most sensitive bits. On the other hand, speech quality is still deemed acceptable if the speech frame is delivered with one or more bit errors in the less sensitive bits, based on human aural perception. An important characteristic for a high bit error rate (BER) environment like EDGE is the robustness for packet loss provided by an AMR codec through redundancy and bit errors and sensitivity sorting.

Another benefit of AMR is adaptive rate adaptation for switching smoothly between codec modes on-the-fly. A large number of AMR codec modes may be used with varying bit rates and resulting voice quality. An AMR codec may include multiple narrowband codec modes: 12.2, 10.2, 7.95, 7.4, 6.7, 5.9, 5.5 and 4.75 kbit/s. Even a wideband (WB) mode AMR WB at 12.65 kbit/s is available.

Typically, for a VoIP connection, the end points of the VoIP communication, e.g., a calling mobile station A and a called mobile station B, negotiate which AMR codec mode will be used for the VoIP connection. If mobile A indicates it can use AMR codec modes 1, 2, and 3 with a default mode to AMR codec mode 2, and if B indicates it can use AMR codec modes 2, 3, and 4 with the default to AMR codec mode 2, then AMR codec mode 2 will likely be selected. The initial selection of AMR codec mode then is typically made at the application protocol layer based on a desired bit rate for the communication. As a result, the codec mode selection for VoIP calls is made at the application layer without any knowledge of current radio channel conditions or selected MCS. The determination of current radio channel conditions and the selection of MCS for the transmission of a next radio block of data are both performed at lower radio access protocol layers, i.e., at the RLC/MAC layers.

Because EDGE varies the bit rate for a TBF by selecting a MCS depending on the radio conditions at each specific radio block period, the bit rate changes very quickly. As a result, a static selection of a VoIP AMR encoder or codec mode often leads to less than optimum performance, e.g., a lower voice quality than necessary. For example, if a maximum bit rate, high voice quality encoder or codec mode is selected, it might sometimes generate data at a bit rate higher than the current over-the-air transfer rate permits, leading to VoIP packets arriving too late after the playout time has passed at the receiving end. Another problem with static selection of a VoIP AMR encoder or codec mode is that if a selected VoIP encoder or codec mode is a low bit rate, low voice quality encoder when the current radio conditions are quite good, much less data is sent in the radio block than could have been sent. In other words, the party at the receiving end could have received much better voice quality at no extra bandwidth expense, but did not because of poor resource utilization.

A related problem is inefficient hardware and bandwidth utilization. In order to reach the higher bit rates offered with EDGE, each radio block for the particular MCS encoder should be as packed full as possible. For example, an MCS-8 radio block can hold 1088 bits. If the encoder has only 500 bits to send, then less than 50% of the possible EDGE throughput is utilized, which translates into lower bit rates.

One approach to these problems might be to change the mode of the voice encoder or codec mode depending on a measured overall data throughput over the radio interface. But this approach is not well suited for "bearers", like EDGE TBFs, that change every radio block with changed radio conditions. In other words, even if a user negotiates a particular bit rate when the TBF is established, the actual bit rate over that TBF varies depending on the quickly changing current radio conditions. Thus, by the time that the measured overall throughput is received at the network entity that can change the mode of the voice encoder, quickly changing radio conditions will have outdated that throughput value.

SUMMARY

The inventors conceived of a better approach that solves these problems and improves voice-over-IP (VoIP) quality and capacity. A VoIP connection is established over a radio interface with a mobile radio station. A current radio condition for the VoIP connection is determined, and from that, a modulation and coding scheme (MCS) for a portion of the VoIP connection is selected. A VoIP voice encoding or codec mode for a portion of the VoIP connection is determined based on the selected modulation coding scheme. VoIP voice is then encoded into a number of VoIP encoded frames using the selected VoIP voice encoding mode, which has an associated bit rate. An optimal number of VoIP encoded frames is included in a VoIP packet for transport over the VoIP connection given the selected voice encoding mode and the selected MCS. The number of VoIP encoded frames is variable and may be varied with changing MCS.

Other adjustments may be made to ensure robustness and/or better performance of the VoIP connection or to increase the overall capacity of the communications system supporting the VoIP connection as well as other connections. For improved robustness, a VoIP voice encoding mode may be selected at a lower data rate than what the determined MCS can support, and/or an MCS may be selected that is lower than the MCS determined current radio condition. If the radio communications system is a time division multiple access (TDMA) type of system, like GPRS and EDGE, one more time slot that the determined number of time slots needed to transmit the VoIP packet may also be used to improve robustness.

Other adjustments may be made to increase the capacity of the VoIP connection. For example, the created VoIP packet is used to form one or more radio blocks for transmission over the radio interface. The number of VoIP encoded frames included in the VoIP packet is intentionally selected to "fill-in" the radio transmission block given the selected voice encoding mode and the selected MCS.

The approach is dynamic rather than static. By providing the VoIP voice coder at the application layer with information about the amount of actual voice bits that can be carried per radio block given the current radio conditions and selected MCS, the voice coder can make more intelligent decisions about the voice coding parameters to be used. Changes in radio conditions for the VoIP connection are detected, and one or more changes may be made in response thereto. When radio conditions have deteriorated, one or more the following may be performed: lower the MCS, lower the rate of the VoIP voice coder, increase the number of time slots, and/or adjust the number of VoIP voice coder frames per IP packet to fill in the radio block for the selected MCS and the selected VoIP voice coder rate. On the other hand, when radio conditions improve, one or more the following may be performed: increase the MCS, increase the rate of the VoIP voice coder, decrease the number of time slots, and/or adjust the number of VoIP voice coder frames per IP packet to fill in the radio block for the selected MCS and the selected VoIP voice coder rate.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
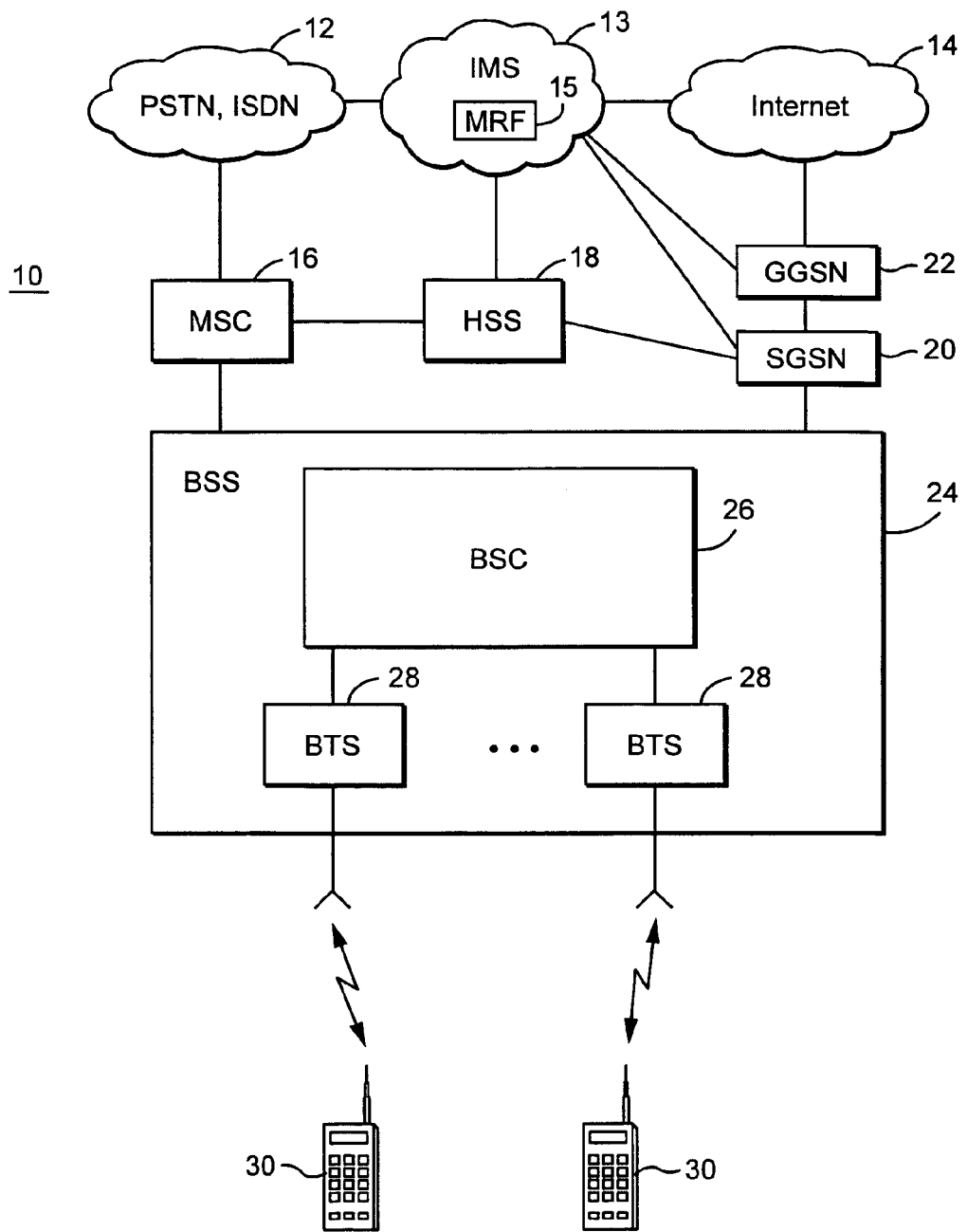
FIG. 1 is a simplified function block diagram of an example mobile radio communications system.

FIG. 1 shows an example mobile radio communications system 10 that couples to one or more circuit-switched networks 12 like the Public Switched Telephone Network (PSTN) and/or the Integrated Services Digital Network (ISDN), etc. via a mobile switching center (MSC) 16 core network node and to one or more packet-switched networks 14 like the Internet via a serving GPRS support node (SGSN) 20 and a gateway GPRS support node (GGSN) 22. The PSTN 12 and ISDN 14 are circuit switched core networks and the MSC core network node 16 supports circuit-switched services. The Internet is a packet-switched core network, and the SGSN 20 and GGSN 22 are packet-switched core network nodes. In addition to these core networks and associated core network nodes is an Internet Protocol Multimedia Subsystem (IMS) 13 which provides IP-based services, like VoIP, and multimedia services. The IMS 13 may include a media resource function (MRF) 15 to deliver media based services. The IMS is coupled to the core networks, to the GGSN 22, and the SGSN 20. The MSC 16, the IMS 13, and the SGSN 20 are coupled to a mobile subscriber database like a home subscriber server (HSS) 18 and to a radio access network.

In this non-limiting example, the radio access network is GSM-based and is referred to as a base station system (BSS) 24. The technology described here in this type of GSM-based/EDGE system made be applied to other type radio access networks. The BSS 24 includes one or more base station controllers (BSCs) 26 (only one is illustrated) coupled to plural base transceiver stations (BTSs) 28. The base station controller 26 controls radio resources and radio connectivity for the cells served by the BTSs 28 under its control. The BTSs 28 communicate with mobile radio stations (MSs) 30 using radio communication over an air interface. Each base transceiver station (BTS) 28 serves one or more cells. For each served cell, the base transceiver station 28 provides a pool of radio transmission resources (typically managed and allocated by the BSC) for communicating with mobile stations in that cell. Each base station (BTS) 28 includes a controller as well as radio transceivers and baseband processing circuitry to handle the radio transmission and reception within each served cell.

Each mobile station (MS) 30 includes a radio transceiver and data processing and control entities/functionalities for providing Voice over Internet Protocol (VoIP) capability. The person skilled in the art will recognize that the mobile station 30 and its data processing and control typically include numerous other functionalities and applications. The mobile station 30 also includes input/output devices such as a display screen, a keypad, a speaker, a microphone, and the like.

Figure 2:
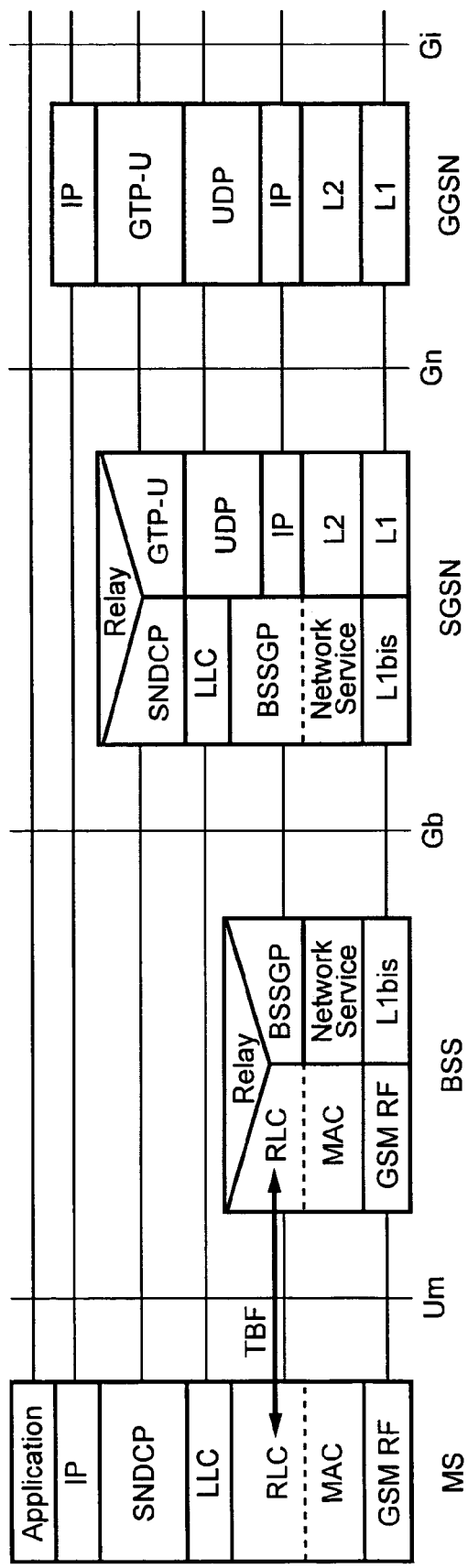
FIG. 2 is a communications protocol diagram of an EDGE (Enhanced Data Rates for Global Evolution) system.

In EDGE, EGPRS, or GPRS, a first link layer protocol context, called a temporary block flow (TBF), is set up uplink from the mobile to the radio network, and a second TBF is set up downlink from the radio network to the mobile radio. A TBF can be viewed as a logical connection between a mobile station (MS) and a packet control unit (PCU) in the network. While the PCU may be located in a BSC 26, the PCU may also be located in a BTS 28, in an SGSN 20, etc. FIG. 2 is a communications protocol diagram of an EDGE system familiar to those skilled in the art. The TBF is shown as a temporary connection between the radio link control (RLC) protocol layer entities in the BSC and the MS. Once an uplink TBF and a downlink TBF have been established for a data connection, then radio resources (time slots in EDGE type systems) can be assigned to support the connection over the radio/air interface. Base station controller (BSC) 26 relays the LLC frames (depicted as "Relay" on BSS in FIG. 2) between the mobile station (MS) 30 and the core network. The media access control (MAC) layer manages the multiplexing of data blocks arising from various TBFs which are active the available physical radio channel, arbitrating among the various mobile users via a time slot scheduling mechanism orchestrated in the BSC where a TBF is selected for each time slot.

In general, the PCU performs LQC and can be located in the BSC, BTS, SGSN, etc. For ease of description only and not limitation, the PCU is assumed to be in the BSC. The BSC 26 in this non-limiting example selects a modulation and coding scheme MCS for the VoIP transmission for every 20 millisecond radio transmission block. Better radio conditions for the VoIP transmission mean that more VoIP encoded bits can be included in each 20 msec radio block; hence, a higher modulation and coding scheme (MCS) is selected. The following table illustrates for EDGE the VoIP encoded bits per 20 msec radio block for each modulation and coding scheme (MCS).

TABLE 1

| | Coding scheme | | | | | | | | |
|---|---|---|---|---|---|---|---|---|---|
| | MCS1 | MCS2 | MCS3 | MCS4 | MCS5 | MCS6' | MCS7 | MCS8 | MCS9 |
| Bits per radio block (20 ms) | 176 | 224 | 296 | 352 | 448 | 592 | 896 | 1088 | 1184 |
| Bit rate [kbps] | 9.5 | 11.2 | 14.8 | 17.6 | 22.4 | 29.6 | 44.8 | 54.4 | 59.2 |

Vocoding or codec mode typically is determined based on a desired voice quality assuming available bandwidth and does not take into account current radio conditions for the VoIP connection. The inventors recognized that better VoIP communications may be achieved by providing the selected MCS, not only to the channel encoder and modulator used to channel encode and modulate a radio block before radio transmission, but also to the VoIP application layer where the voice is vocoded, framed, and packetized.

Figure 3:
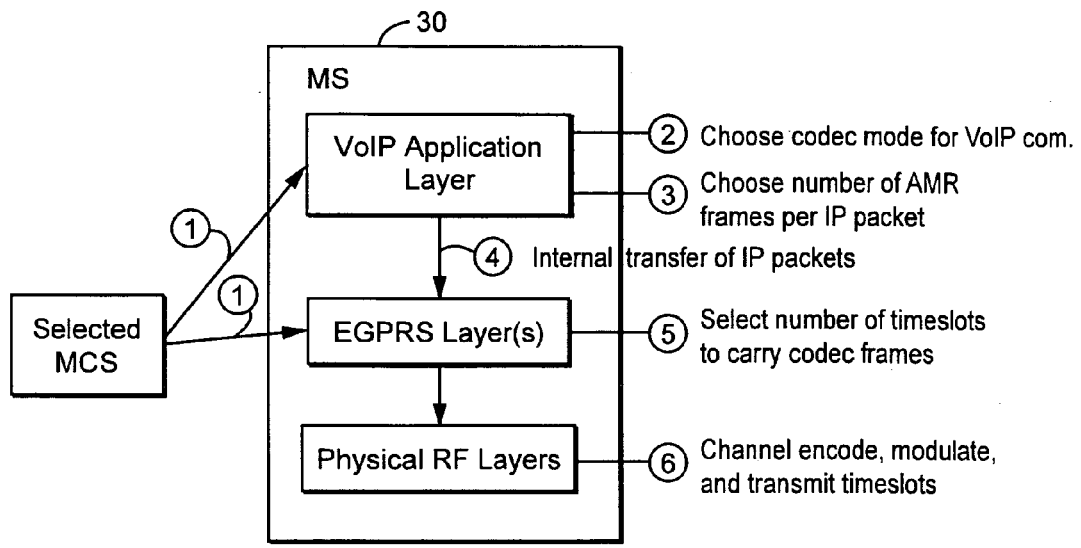
FIG. 3 is a simplified function block diagram of mobile station showing the interaction between protocol layers and VoIP functions performed at different protocol layers in accordance with one non-limiting example uplink implementation.

In that regard, FIG. 3 illustrates a simplified function block diagram of a mobile station (MS) 30 in which the MCS selected for a VoIP communication involving the MS 30 is provided, at reference numeral (1), both to the EGPRS lower protocol level for traditional channel encoding and modulation of the radio block and also to the VoIP application at the higher application protocol level. With that information at reference numeral (2), the VoIP application chooses a voice coder/decoder (codec) mode for the VoIP communication that is appropriate for the current radio conditions. In EGPRS, the codec is an AMR codec. The MCS is selected, for example by a link quality controller (LQC) 32 shown in FIG. 5, based on the current detected radio conditions. A higher codec mode corresponds to a higher bit rate codec output, and a lower codec mode corresponds to a lower bit rate codec output.

The mobile's codec chooses a number of AMR frames for an IP packet at reference numeral (3). The number of AMR frames is optimized given the selected AMR codec mode to fill out the radio block size that will be used for the selected MCS at the EGRPS level. For example, 20 msec of speech may be encoded into one AMR frame which coincides with 20 msec radio blocks. The AMR frames are packetized (packed into an IP packet) and then the IP packet is transferred within the mobile station 30 at reference numeral (4) to the EGPRS layer(s) corresponding to the SNDCP/LLC and RLC/MAC layers as shown in FIG. 2. The EGPRS layer(s) form radio transmission blocks to carry the packet data and select a number of time slots to carry each radio transmission block at reference numeral (5) by comparing the amount of data needed to be sent with the amount of data that fits into each timeslot. For example, if only 1 timeslot is needed and 1 timeslot is allocated to the MS by the PCU, then the MS sends the data. If only 1 timeslot is needed and 2 timeslots are allocated to the MS by the PCU, then the MS sends the data and requests release of the TBF. If 2 timeslots are needed and only 1 timeslot is allocated to the MS by the PCU, then the MS starts to send the data and requests the PCU for an upgrade to 2 timeslots. If 2 timeslots are needed and 2 timeslots are allocated to the MS by the PCU, then the MS sends the data. The radio transmission blocks are channel encoded and modulated in accordance with the selected MCS for this portion of the VoIP transmission (one or more packets) and transmitted over the radio interface as indicated at reference numeral (6).

Figure 4:
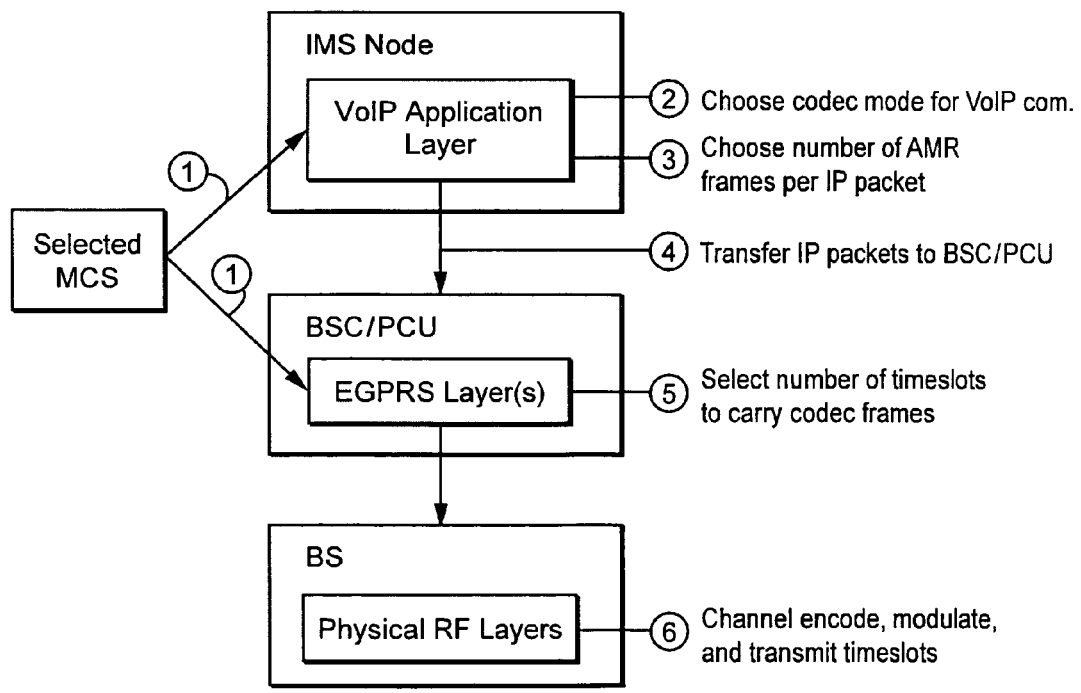
FIG. 4 is a simplified function block diagram showing the interaction between VoIP functions performed at different nodes including an IMS node, a BSC node, and a BTS node in accordance with one non-limiting example downlink implementation.

Similar procedures are performed in the downlink for the VoIP connection but the functions are preferably implemented by different entities or nodes. In that regard, FIG. 4 illustrates a simplified function block diagram of an IMS node 14 in which the MCS selected for the VoIP communication is provided, at reference numeral (1), to the VoIP application executed in the IMS node. With that information at reference numeral (2), the VoIP application chooses an AMR codec mode for the VoIP communication that is suited for the current radio conditions. The selected AMR codec mode chooses a number of AMR frames for an IP packet at reference numeral (3). The number of AMR frames is optimized given the selected AMR codec mode to fill out the radio block size that will be used for the selected MCS at the EGRPS level. The AMR frames are packetized, and then the IP packets are transferred at reference numeral (4) to the EGPRS layers implemented using a packet control unit 31 shown in FIG. 5. In this example, the CPU is located in the BSC 26. The packet control unit 31 forms radio transmission blocks to carry the packet data and a time slot scheduler 40 associated with the packet control unit 31 selects a number of time slots to carry each radio transmission block at reference numeral (5) in a manner that may be similar, for example, to what was described above for the mobile station. The radio transmission blocks are provided to one or more base stations 28 that implement physical layer operations including channel encoding and modulating the radio transmission blocks in accordance with the selected MCS for this portion of the VoIP transmission (one or more packets) and transmitting the modulated information in the during the selected time slots over the radio interface as indicated at reference numeral (6).

Figure 5:
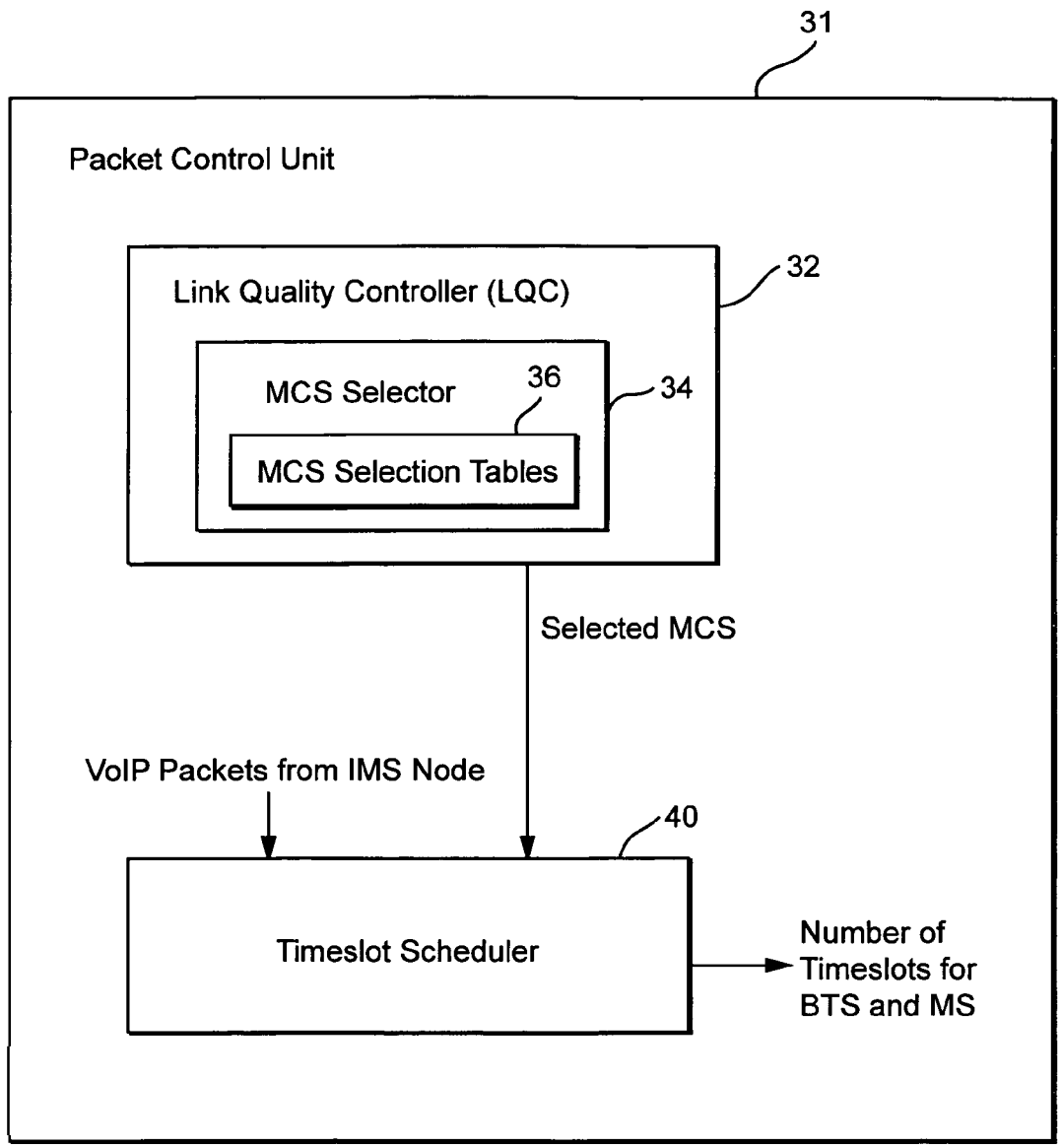
FIG. 5 is a block diagram illustrating an example implementation details in a Packet Control Unit (PCU)

FIG. 5 illustrates in simplified block format the link quality controller (LQC) 32 which is included in this example in the packet control unit (PCU) 31. Again, the PCU 31 could be located in the BSC, a base station, or in a core network node like an SGSN. The LQC 32 includes an MCS selector 34 which includes MCS selection lookup tables 36. The input to the selection tables 36 may be one or more detected radio conditions associated with the VoIP connection, such as RSSI, SIR, CIR, BER, BLER, etc. A better radio condition results in a higher number (higher throughput but less robust) MCS being selected, and less favorable radio conditions result in a lower number (lower throughput but more robust) MCS being selected. The selected MCS is provided to a timeslot scheduler 40 which also receives VoIP packets from the IMS node 14. The timeslot scheduler 40 transforms the VoIP packets into radio transmission blocks that are sized based on the selected MCS. The timeslot scheduler 40 determines a number of time slots needed to carry the radio block at the selected MCS using, for example, the procedures explained for step (5) in FIG. 3. The radio blocks formed in the PCU 31 and the selected time slots are forwarded to the appropriate base station(s) 28 for transmission over the air interface to the mobile station 30.

Figure 6:
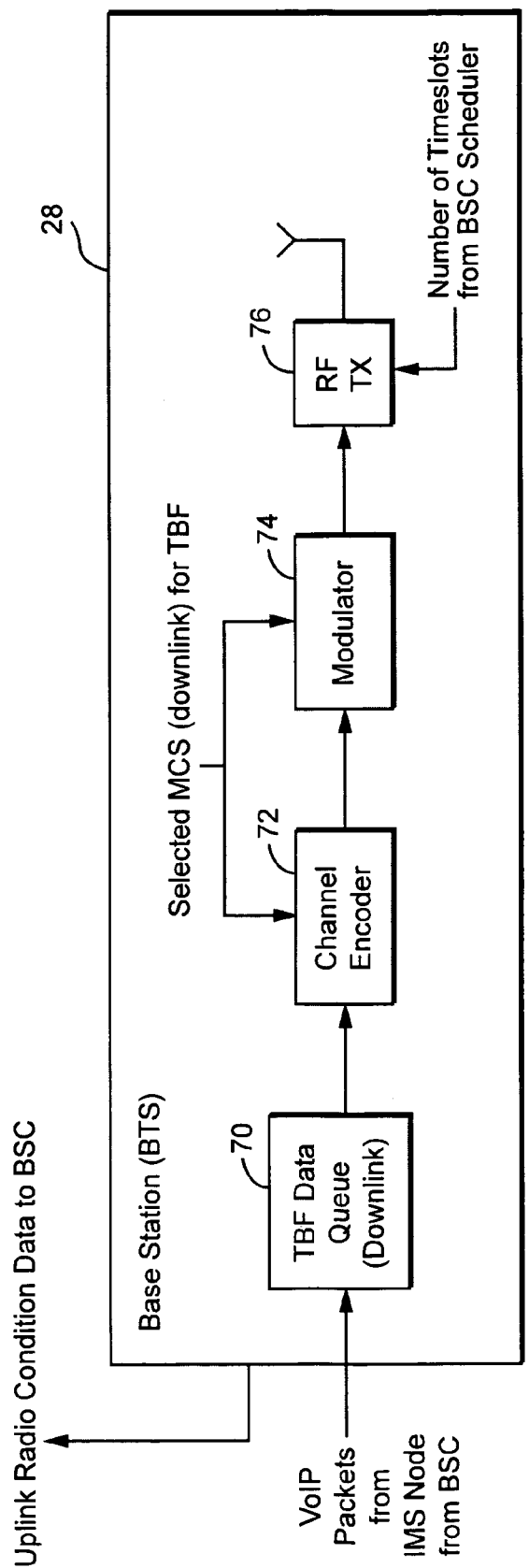
FIG. 6 is a block diagram illustrating an example implementation details in a BTS.

FIG. 6 shows a simplified block diagram of an example base station 28. A TBF data queue 70 buffers radio transmission blocks for downlink transmission to the mobile station 30. Radio blocks popped off the queue 70 are channel encoded in the channel encoder 72 and modulated in the modulator 74 using the selected MCS for this TBF. The modulated output is then transmitted over the air in the RF transmitter 76. The RF transmitter 76 receives information from the time slot scheduler 40 regarding the time slots during which to transmit the modulated radio block data. The base station also forwards the uplink radio blocks received from the mobile station 30 to the BSC 26, but RF receiving, demodulating, and channel decoding blocks for the uplink communication are not shown. The base station 28 detects the signal quality of uplink communications received from the mobile station 30 and provides the LQC 32 with detected radio condition information for determining/adjusting the selected MCS. In one example embodiment, the radio condition information is updated for each 20 msec radio block.

Figure 7:
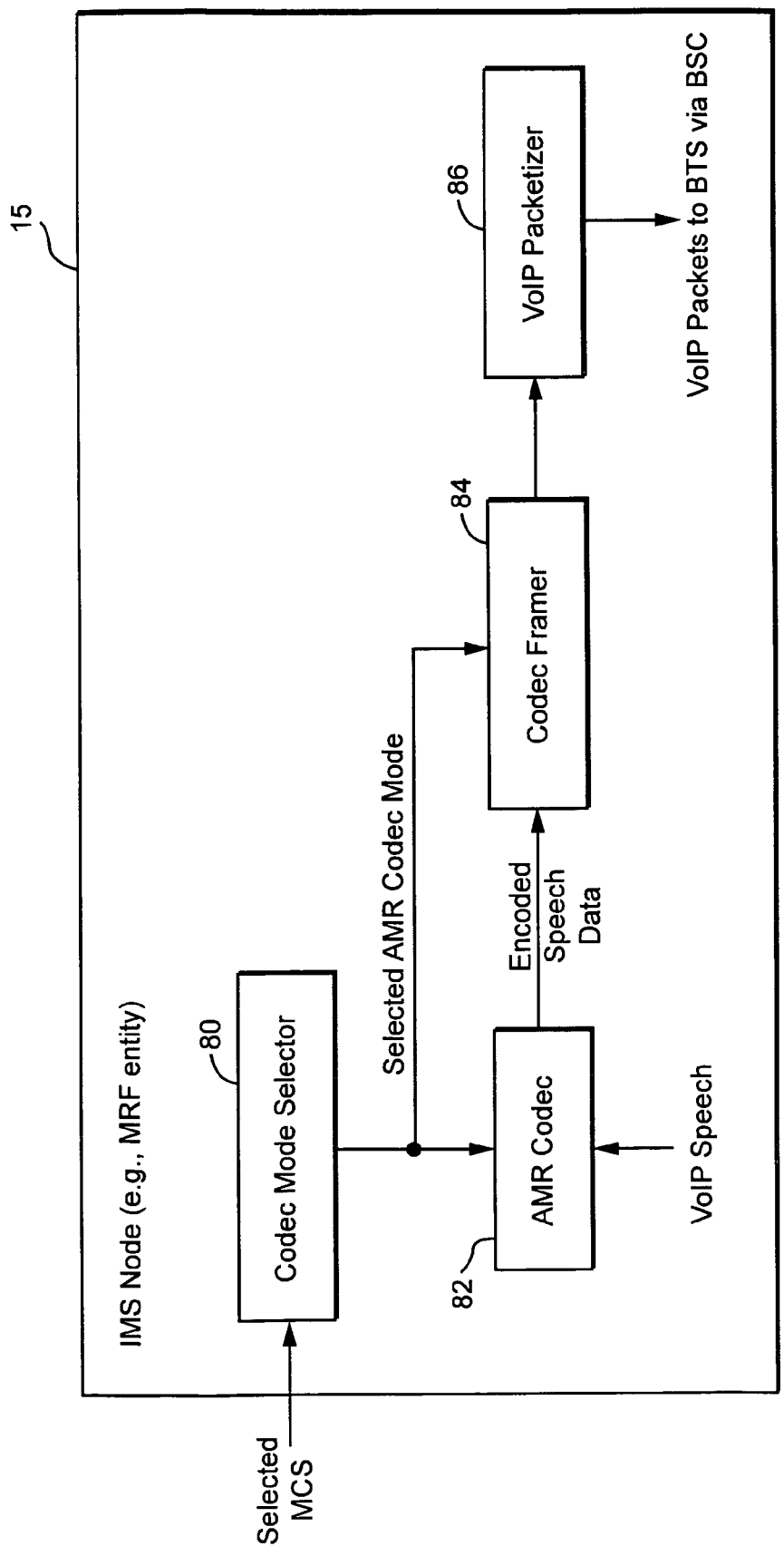
FIG. 7 is a block diagram illustrating an example implementation details in an IMS node.

FIG. 7 illustrates an example, simplified block diagram of an IMS node that could be implemented using an MRF entity 15. The selected MCS is received or otherwise determined from information provided by the MCS selector 34 in the BSC. Based on the selected MCS, a codec mode selector 80 selects an associated codec mode which has an associated bit rate for the vocoded speech. The selected codec mode is provided to an AMR codec 82 which vocodes the VoIP speech according to the selected codec mode. A codec framer 84 receives the vocoded speech data and frames that data in accordance with the selected AMR codec, which itself was selected based on the current MCS selection. The codec framer 84 generates a number of frames to be included in a VoIP packet by VoIP packetizer 86. That number is determined based on the selected codec mode in order to optimally fill out the radio transmission block that will be used in the EGPRS layers based on the selected MCS. In order words, the codec framer 84 can choose the correct number of AMR codec frames to fill the radio block size governed by the selected MCS because the selected AMR codec mode provided to the codec framer 84 is also governed by the selected MCS. The VoIP packets are provided to the base station via the BSC.

Figure 8:
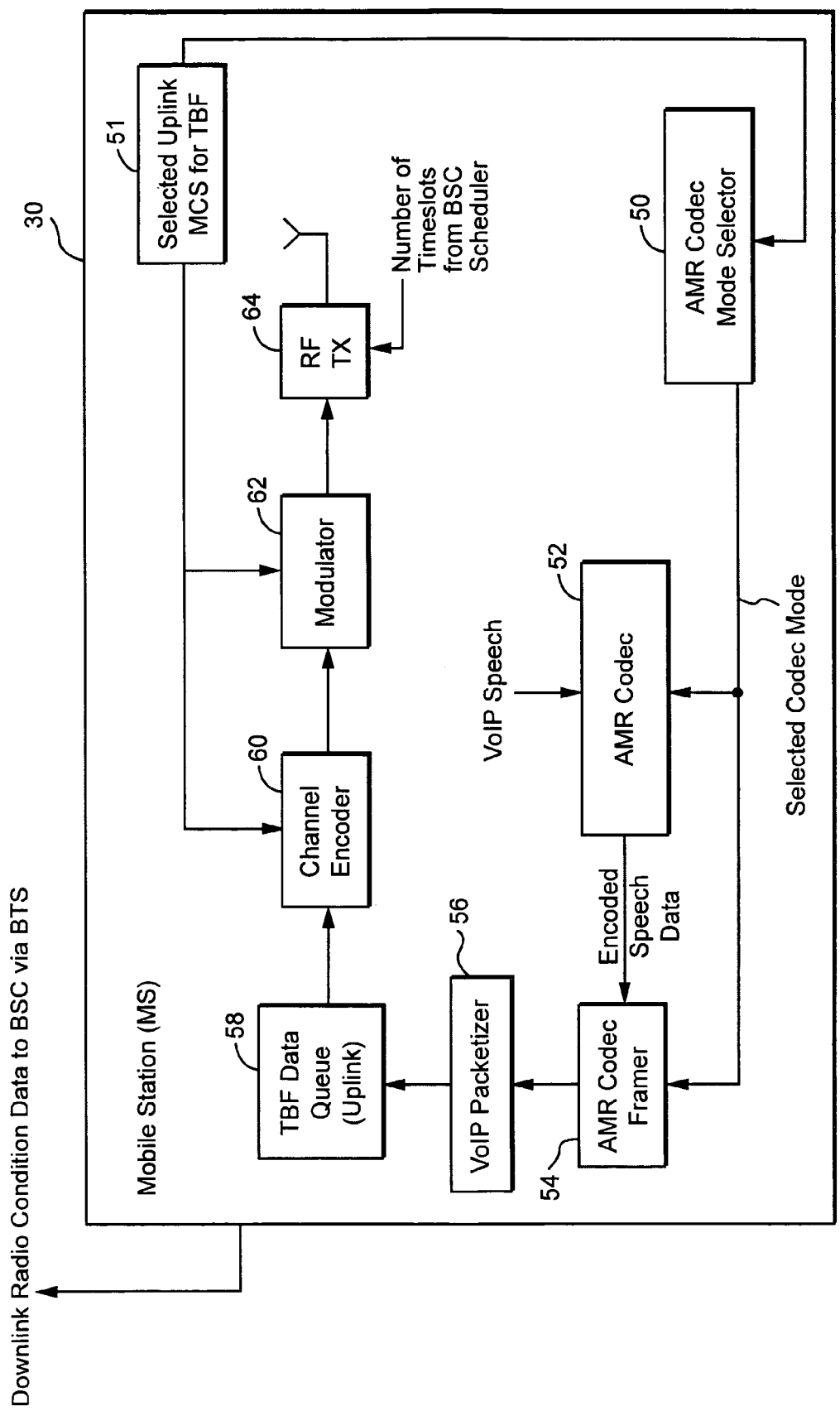
FIG. 8 is a block diagram illustrating an example implementation details in a mobile station.

Referring to FIG. 8, the mobile station 30 performs similar functions for the uplink because the uplink and downlink can have different MCS's. The mobile includes an AMR codec mode selector 50 that receives a selected uplink MCS for this TBF. The uplink MCS is determined by the MCS selector 34 in the BSC and is sent to the MS as indicated generally at block 51. The selected codec mode is provided to an AMR codec 52 which vocodes received VoIP speech. The output bit stream is framed in an AMR codec framer 54 according to the selected codec mode as explained above for the downlink.

The AMR codec frames are formed into VoIP packets which are then stored in a TBF data queue 58. The packets are channel encoded and modulated according to the selected MCS. The modulated data is formed into radio transmission blocks which are transmitted over the time slots identified by the time slot scheduler 40.

Consider an example where the VoIP application in the mobile station or the IMS node selects a VoIP codec mode to encode 20 msec of VoIP voice into VoIP vocoded bits. A higher codec mode means better voice quality because more bits carry the 20 msec of VoIP voice. The following Table 2 includes an EDGE example of different AMR codec modes or rates.

TABLE 2

| AMR Codec Mode/Rate | 4.75 | 7.95 | 12.65 WB | 12.65 WB (2 AMR frames per IP packet) |
|---|---|---|---|---|
| Bits per AMR speech frame (20 ms) with header overhead | 224 | 288 | 376 | 640 |

The following Table 3 shows the lowest MCS that can be used and still fit an IP packet with two voice encoded speech frames for different numbers of time slots (e.g., 0.5, 1, 1.5, or 2) used to transmit the 20 msec radio blocks associated with that packet. If a lower number of time slots are used, then a higher MCS having a higher bit rate must be used to adequately transmit that much data. By adding more time slots, a lower bit rate, more robust MCS can be used. So Table 2 shows how many timeslots are needed for a given MCS mode. For MCS1 and AMR 4.75, one timeslot is sufficient, so there is no need to use 1.5 or 2 timeslots as all the data for the 20 msec period fits into a single timeslot sent during that 20 msec radio block period. More timeslots may be needed for AMR WB 12.65. Consequently, if the radio conditions deteriorate requiring a lower MCS, the time slot scheduler may increase the number of time slots used in order to maintain the bit rate delivered by the chosen codec mode. Otherwise, when radio conditions deteriorate, the codec rate would need to be reduced in order to successfully transmit the VoIP data.

TABLE 3

| | Timeslots used | | | |
|---|---|---|---|---|
| AMR Mode | 0.5 | 1 | 1.5 | 2 |
| AMR 4.75: 2 packed frames/IP packet => 320 bits in the IP packet | MCS 5 | MCS 1 | — | — |
| AMR WB 12.65: 2 packed frames/IP packet => 640 bits in the IP packet | MCS 7 | MCS 5 | MCS 2 | MCS 1 |

The following Table 4 shows the average packet size for two different AMR codec modes—AMR 4.75 (narrowband (NB)) and AMR 12.65 (wideband (WB)). With more frames included in the IP packet by the codec, the packet size increases but at a cost of reduced bit rate. The number of frames per IP packet is selected up to a maximum configurable limit based on the maximum number of AMR frames per IP packet that the MCS block size can hold. This is then a trade-off between the time to buffer speech on sending side and the capacity utilization of the radio network.

TABLE 4

| | Speech codec | | | | | |
|---|---|---|---|---|---|---|
| | AMR 4.75 (NB) | | | AMR-WB 12.65 (WB) | | |
| | Frames per IP packet | | | | | |
| | 1 | 2 | 3 | 1 | 2 | 3 |
| Speech data* [bits] | 112 | 208 | 312 | 264 | 528 | 787 |
| Avg. IP headers** [bits] | 32 | 32 | 32 | 32 | 32 | 32 |
| LLC + SNDCP [bits] | 80 | 80 | 80 | 80 | 80 | 80 |
| Avg. Packet size | 224 | 320 | 424 | 376 | 640 | 896 |
| Avg. bit rate [kbit/s] | 11.2 | 8 | 7.1 | 18.8 | 16 | 14.9 |

Absent the coordination between the lower protocol layer(s) that handle the MCS selection for each radio block transmission and the VoIP codec mode selection made at the higher application protocol layer, the VoIP connection is adversely impacted—either because of inefficient speech delivery or low quality speech delivery. For example, assume a VoIP encoder selects a low quality/low bit rate codec mode based on historical events: 224 bits are generated for 20 msec of speech. Assume the MCS selector selects for this 20 msec a high MCS-7 based on current radio conditions so that 897 bits are available for use. If the VoIP application is not aware of this higher capacity, only 25% of the 897 bits available are used. The listening party could have experienced a much better voice quality at no extra bandwidth expense.

To achieve a better result, one of several configurable alternatives may be used. For example, the VoIP encoder is notified of the availability of MCS-7 transmission and thus changes from AMR 4.75 to AMR 12.65 WB. In that case, 376 bits are generated for the 20 ms speech period instead of 224 bits. These speech bits are sent immediately on one timeslot with 1 AMR frame per IP packet. As a result, the receiver receives better voice quality at no extra "cost" to the system. Alternatively, the VoIP encoder may be notified of the availability of MCS-7 transmission and thus changes from ARM 4.75 to AMR 12.65 WB. In this case, 376 bits are generated for the 20 ms voice period. The AMR codec also changes to pack 2 AMR frames into each IP packet. As a result, 640 bits are generated during a 40 ms voice period. That 40 ms of speech is then sent over one radio block (e.g., one 20 ms 1 timeslot). As compared to the first scenario, the system capacity is doubled because speech is only sent on every second radio block period on that timeslot (at the small expense of 20 ms of extra buffering time).

Consider another problematic situation where the VoIP encoder selects a high bit rate codec, 12.65 WB, based on historical events corresponding to 376 bits per 20 msec of speech. On the other hand, the MCS selector selects a minimum MCS-1 based on the current bad radio conditions which can deliver only 176 bits. But since the voice encoder in the VoIP application is not aware of that MCS limitation, the IP packet arrives to the packet control unit with 376 bits. Even if the packet control unit can adapt and allot two time slots for the connection, that only provides a capacity of 352 bit which is still less than the 376 needed. As a result, the transfer lags behind the speed at which the data is generated resulting in buffer under-run and lower quality speech for the listening party.

This problematic situation is handled better by applying the technological approaches described here. For example, the AMR codec is notified of the MCS-1 selection, changes to AMR 4.75, packs 2 AMR frames per IP packet, and thus generates 320 bits every 40 ms. Those 40 ms of speech can then be sent over two radio block periods each carrying 176 bits, i.e., 2×176=352>320. As a result, speech continues to flow without interruption from the speaking party's mobile station.

So there is an important interaction between the current MCS and the voice codec mode. Since the codec is provided with the selected MCS, it can make appropriate mode/rate adaptations. The number of VoIP encoded frames included in the VoIP packet is intentionally selected to fill-in the radio transmission block given the selected voice encoding mode and the selected MCS.

Other adjustments may also be made to ensure robustness and/or better performance of the VoIP connection or to increase the overall capacity of the communications system supporting the VoIP connection as well as other connections. For improved robustness, a VoIP voice encoding mode may be selected at a lower data rate than what the determined MCS can support, and/or an MCS may be selected that is lower than the MCS determined current radio condition. If the radio communications system is a time division multiple access (TDMA) type of system, like GPRS and EDGE, one more time slot that the determined number of time slots needed to transmit the VoIP packet may also be used to improve robustness.

Figure 9:
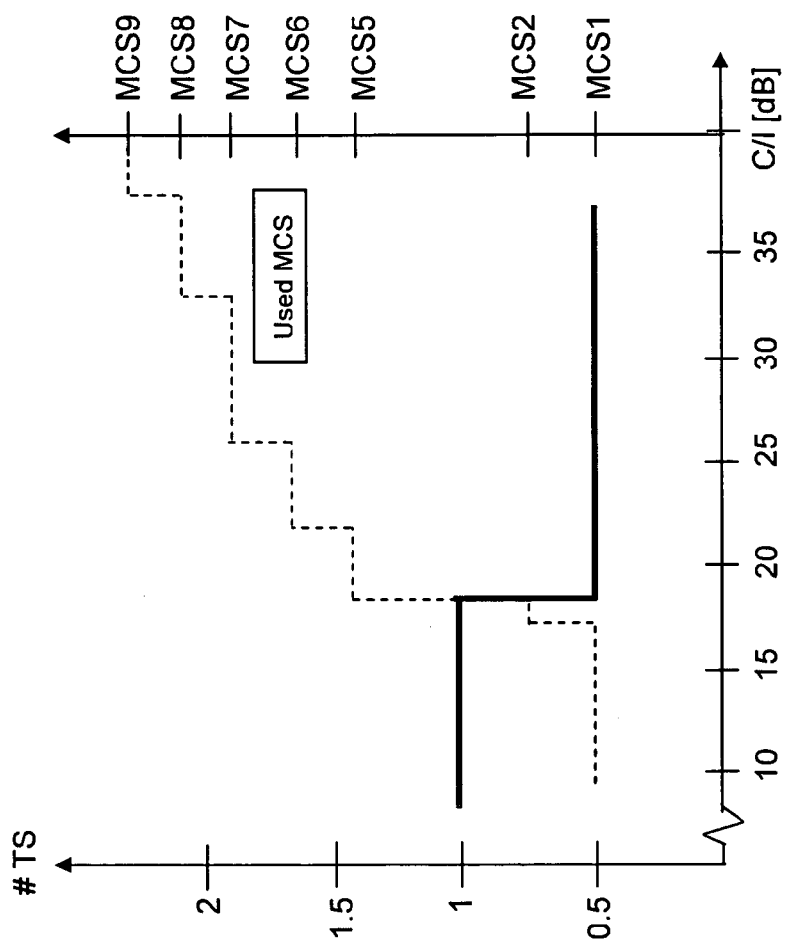
FIG. 9 is a graph illustrating a number of timeslots to transmit VoIP data at different C/I for an AMR 4.75 NB codec at 2 AMR frames per IP packet.
Figure 10:
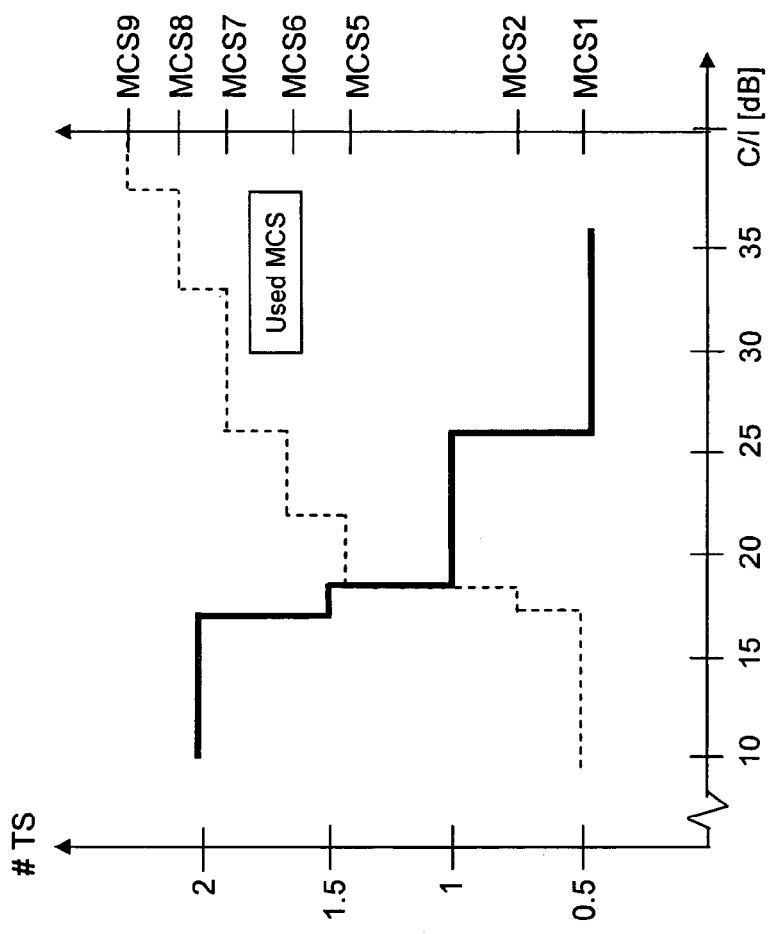
FIG. 10 is a graph illustrating a number of timeslots to transmit VoIP data at different C/I for an AMR 12.65 WB codec at 2 AMR frames per IP packet.

FIGS. 9 and 10 show two different examples that illustrate the interrelationship between radio condition (C/I in dBs), MCS, and number of time slots used. FIG. 9 is for an AMR mode of 4.75 at 2 AMR frames per packet, and FIG. 10 is for an AMR mode of 12.65 at 2 AMR frames per packet. The dotted line shows the MCS that can be selected at each C/I. The solid line shows how many timeslots are needed for that particular MCS mode for the codec and number of AMR frames per IP packet. This speech is sent immediately on one timeslot. As a result, the receiver gets better voice quality at no additional cost to the system.

So multiple adjustments may be made to increase the capacity and/or the reliability of the VoIP connection. When radio conditions have deteriorated, one or more the following may be performed: lower the MCS, lower the rate of the VoIP voice coder, increase the number of time slots, and/or adjust the number of VoIP voice coder frames per IP packet to fill in the radio block for the selected MCS and the selected VoIP voice coder rate. On the other hand, when radio conditions improve, one or more the following may be performed: increase the MCS, increase the rate of the VoIP voice coder, decrease the number of time slots, and/or adjust the number of VoIP voice coder frames per IP packet to fill in the radio block for the selected MCS and the selected VoIP voice coder rate. Other adjustments may be used.

Although various embodiments have been shown and described in detail, the claims are not limited to any particular embodiment or example. For example, any codec may be used. Examples of alternative codecs include: G.729, G.729a, G.723.1 using an MPC-MLQ algorithm, G.723.1 using an ACELP algorithm, G.711, iLBC, RCU enhanced iLBC, G.729, or G.723.1, enhanced G.711, iPCM-wb, iSAC, etc. None of the above description should be read as implying that any particular element, step, range, or function is essential such that it must be included in the claims scope. The scope of patented subject matter is defined only by the claims. The extent of legal protection is defined by the words recited in the allowed claims and their equivalents. It is to be understood that the invention is not to be limited to the disclosed embodiment, but on the contrary, is intended to cover various modifications and equivalent arrangements.

What is claimed is:

1. A method for use with a voice-over-IP (VoIP) connection established over a radio interface with a mobile radio station, comprising:
   determining a current radio condition associated with the VoIP connection;
   determining a modulation and coding scheme (MCS) for a portion of VoIP information to be communicated over the VoIP connection based on the determined current radio condition;
   selecting a VoIP voice encoding mode for a portion of the VoIP connection based at least in part on the determined modulation coding scheme, the VoIP voice encoding mode having an associated bit rate;
   encoding VoIP voice into a variable number of VoIP encoded frames using the selected VoIP voice encoding mode, wherein the variable number of VoIP encoded frames depends on the determined MCS;
   including the number of VoIP encoded frames in a VoIP packet for transport over the VoIP connection;
   and wherein the variable number of VoIP encoded frames is an optimal number to increase the amount of VoIP bits included in a radio block transmitted over the radio interface.

2. The method in claim 1, further comprising: varying the variable number of VoIP encoded frames when a different MCS is determined for the VoIP connection.

3. The method in claim 1, further comprising: selecting a VoIP voice encoding mode at a lower data rate than what the determined MCS can support.

4. The method in claim 1, further comprising: selecting an MCS lower than the determined MCS for the current radio condition.

5. The method in claim 1, wherein the method is for use in a GPRS or EDGE type system, radio channel resources for supporting connections include time slots, and the VoIP voice encoding mode is an adaptive multi-rate (AMR) coder/decoder (codec).

6. The method in claim 5, further comprising: determining a number of timeslots to use in transmitting the VoIP packet.

7. The method in claim 6, further comprising: using one more time slot that the determined number to transmit the VoIP packet.

8. The method in claim 6, further comprising: forming a radio transmission block using the VoIP packet; channel encoding and modulating the radio transmission block using the determined MCS; and transmitting the channel encoded and modulated radio transmission block over the radio interface using the determined number of time slots.

9. The method in claim 8, wherein the radio transmission block is a fixed size, the method further comprising: adjusting the number of VoIP encoded frames included in the VoIP packet to fill in the radio transmission block.

10. The method in claim 8, further comprising: selecting one or more of the following to increase robustness of the VoIP connection: lower the MCS, lower the rate of the VoIP voice coder, increase the number of time slots, or adjust the number of VoIP voice coder frames per IP packet to fill in the radio block for the selected MCS and the selected VoIP voice coder rate.

11. The method in claim 8, further comprising: detecting a change in radio conditions for the VoIP connection; and selecting one or more of the following if the change is an improved radio condition: increase the MCS, increase the rate of the VoIP voice coder, decrease the number of time slots, or adjust the number of VoIP voice coder frames per IP packet to fill in the radio block for the selected MCS and the selected VoIP voice coder rate.

12. The method in claim 1 implemented in the mobile station or in an Internet Protocol Multimedia Subsystem (IMS) node.

13. An apparatus for use in a mobile node for supporting a voice-over-IP (VoIP) connection established over a radio interface via a radio access network, comprising:
   a modulation and coding scheme (MCS) selector for selecting a channel encoding scheme and the modulation scheme use for a portion of VoIP voice information to be transmitted over the VoIP connection based on a determined current radio condition associated with the VoIP connection;
   a VoIP voice encoder that includes a processing system that includes at least one processor, the processing system configured to (1) select a voice encoding mode for the portion of VoIP voice information based at least in part on the selected MCS, the VoIP voice encoding mode having an associated bit rate, and (2) encode the VoIP voice information into a variable number of VoIP encoded frames using the selected VoIP voice encoding mode, wherein the variable number of VoIP encoded frames depends on the selected MCS;
   a VoIP packetizer for including the number of VoIP encoded frames in a VoIP packet for transport over the VoIP connection;
   and wherein the variable number of VoIP encoded frames is an optimal number to increase an amount of VoIP bits included in a radio block transmitted over the radio interface by the mobile node.

14. The apparatus in claim 13, wherein the VoIP voice encoder is further configured to vary the variable number of VoIP encoded frames when a different MCS is determined for the VoIP connection.

15. The apparatus in claim 13, wherein the VoIP voice encoder is further configured to select a VoIP voice encoding mode having a lower bit rate than what the determined MCS can support.

16. The apparatus in claim 13, wherein the MCS selector is configured to select an MCS lower than the MCS determined for the current radio condition.

17. The apparatus in claim 13, wherein the apparatus is configured for use in a GPRS type system where radio channel resources for supporting the VoIP connection include time slots and the VoIP voice encoder is an adaptive multi-rate (AMR) coder/decoder (codec).

18. The apparatus in claim 17, further comprising: circuitry for determining a number of timeslots to use in transmitting the VoIP packet.

19. The apparatus in claim 18, further comprising: circuitry configured to form a radio transmission block using the VoIP packet; a channel encoder for channel encoding information based on the selected channel encoding scheme; a modulator for modulating channel encoded information from the channel encoder based on the selected modulation scheme; and radio transceiving circuitry configured to transmit the modulated information over the radio interface using one more time slot than the determined number of time slots.

20. The apparatus in claim 19, wherein the radio transmission block is a fixed size, and wherein the VoIP voice encoder is configured to adjust the number of VoIP encoded frames included in the VoIP packet to fill in the radio transmission block.

21. The apparatus in claim 19, further comprising: control circuitry configured to select one or more of the following to increase robustness of the VoIP connection: lower the MCS, lower the rate of the VoIP voice coder, increase the number of time slots, or adjust the number of VoIP voice coder frames per IP packet to fill in the radio block for the selected MCS and the selected VoIP voice coder rate.

22. The apparatus in claim 19, further comprising: control circuitry configured to select one or more of the following when the current radio condition improves: increase the MCS, increase the rate of the VoIP voice coder, decrease the number of time slots, or adjust the number of VoIP voice coder frames per IP packet to fill in the radio block for the selected MCS and the selected VoIP voice coder rate.

* * * * *

UNITED STATES PATENT AND TRADEMARK OFFICE
CERTIFICATE OF CORRECTION

PATENT NO.           : 8,289,952 B2                                         Page 1 of 1
APPLICATION NO.      : 11/346565
DATED                : October 16, 2012
INVENTOR(S)          : Larsson et al.

It is certified that error appears in the above-identified patent and that said Letters Patent is hereby corrected as shown below:

In the Specifications

In Column 2, Line 41, delete "(MSCs):" and insert -- (MCSs): --, therefor.

In Column 5, Line 16, delete "node; and" and insert -- node; --, therefor.

In Column 7, Line 60, delete "EGRPS" and insert -- EGPRS --, therefor.

In Column 8, Line 43, delete "EGRPS" and insert -- EGPRS --, therefor.

Signed and Sealed this
First Day of October, 2013

Teresa Stanek Rea
*Deputy Director of the United States Patent and Trademark Office*